United States Patent
Suzuki et al.

[11] Patent Number: 5,614,949
[45] Date of Patent: Mar. 25, 1997

[54] EXPOSURE CONTROL DEVICE FOR ELECTRONIC ENDOSCOPE

[75] Inventors: Shigeo Suzuki; Fujio Okada, both of Omiya, Japan

[73] Assignee: Fuji Photo Optical Co Ltd., Omiya, Japan

[21] Appl. No.: 402,488

[22] Filed: Mar. 10, 1995

[30] Foreign Application Priority Data

Jun. 28, 1994 [JP] Japan .................................. 6-168977
Jun. 28, 1994 [JP] Japan .................................. 6-168978

[51] Int. Cl.$^6$ .................................................. H04N 5/232
[52] U.S. Cl. ........................... 348/296; 348/65; 348/362
[58] Field of Search ............................ 348/296, 65, 68, 348/69, 362

[56] References Cited

U.S. PATENT DOCUMENTS

| | | | |
|---|---|---|---|
| 4,805,024 | 2/1989 | Suzuki et al. | 348/296 |
| 5,091,779 | 2/1992 | Ams et al. | 348/69 |
| 5,422,670 | 6/1995 | Fukui | 348/296 |
| 5,475,420 | 12/1995 | Buchin | 348/65 |

Primary Examiner—Wendy Garber
Attorney, Agent, or Firm—Ronald R. Snider

[57] ABSTRACT

There is provided an electronic shutter control device for an electronic endoscope which can control exposure with high precision even if the intensity of incident light is high in a close-up and the like. The control device has a mask circuit for forming masks having a predetermined width in upper and lower portions of a monitor screen in a vertical scanning direction, and a detection circuit for verifying whether or not the intensity of incident light is higher than a predetermined value. An electronic shutter control circuit forms a discharge pulse for electronic shutter control from a driving pulse generated in a blanking period of a horizontal synchronizing signal when the intensity of incident light is lower than the predetermined value, and forms dense discharge pulses, whose number is, for example, 256 in one horizontal synchronizing signal, in an effective period of the horizontal synchronizing signal in an area masked in the vertical scanning direction when the intensity of incident light is higher than the predetermined value. High-precision exposure control can be achieved in a close-up by controlling the storage charge amount by the sweep control pulses and the like.

8 Claims, 7 Drawing Sheets

EXPOSURE CONTROL DEVICE FOR ELECTRONIC ENDOSCOPE

BACKGROUND OF THE INVENTION

This application claims the priority of japanese Patent Applications Nos. 6-168977 and 6-168978 filed on Jun. 28th, 1994.

1. Field of the Invention

The present invention relates to an electronic endoscopic device, and more particularly, to electronic shutter control of a solid-state image pickup device in an electronic endoscopic device.

2. Description of the Related Art

An electronic endoscopic device has an electronic shutter function for controlling the storage time of a charge as pixel information for a CCD (Charge Coupled Device) which is a solid-state image pickup device. This electronic shutter function can control exposure in image forming instead of ALC (Automatic Light Control) using a stop member and the like, which has been adopted hitherto. In other words, while the ALC detects the luminance of an image signal and controls the amount of incident light by a stop member or the like, the electronic shutter function can obtain an image having the optimum brightness by controlling the amount of charge to be stored in the solid-state image pickup device based on luminance information of an image signal, that is, by decreasing the charge storage time when an image is bright, and increasing it when the image is dark.

However, in the above-mentioned electronic shutter control, since control signals for charge storage, that is, a discharge pulse and a read pulse are generated during a blanking period of a horizontal synchronizing signal, exposure control accuracy is lowered and exposure errors occur when a subject is bright in, for example, a close-up.

FIG. 8 is a waveform chart showing a conventional control operation. In a control device, for example, 262.5 horizontal synchronizing signals shown in FIG. 8(B) are generated during a vertical scanning period (1V) shown in FIG. 8(A). If a control signal or the like is formed during an effective period of the horizontal synchronizing signal, noise appears in an image, and therefore, a control pulse for an electronic shutter is formed during each blanking period B of the horizontal synchronizing signals. In an example shown in FIG. 8(C), discharge pulses Pa are formed in blanking periods B of horizontal synchronizing signals 1 to 131 based on an exposure control signal, and a read pulse Pb is formed in the last blanking period B and a blanking period of a vertical synchronizing signal. As shown in FIG. 8(D), a charge stored in elements of the CCD is once discharged by the above discharge pulses Pa, and then, the charge storage is started again. A stored charge denoted by numeral 100 is read out by the read pulse Pb.

In the above case of FIGS. 8(C) and (D), the leading end of the electronic endoscope is not close to the subject and exposure time is set long. In this case, even if the last discharge pulse Pa is output during a blanking period B of the previous horizontal synchronizing signal 130 shown by a broken line, an added charge 101 has only a little influence on the charge 100. However, as shown in FIGS. 8(E), (F) and (G), if the leading end of the endoscope is close to the subject and the exposure time is short, that is, when discharge pulses Pa have been formed up to a blanking period B of a horizontal synchronizing signal 260, the amount of a stored charge 102 is small. Therefore, an added charge 103 stored after a discharge pulse Pa of the previous horizontal synchronizing signal 259 shown by a broken line has a great effect on the stored charge 102. Accordingly, in a close-up or the like, exposure accuracy in the electronic shutter control is lowered, and more exposure errors arise than in cases other than the close-up.

SUMMARY OF THE INVENTION

The present invention has been achieved in the light of the above-mentioned state of affairs, and an object of the present invention is to provide an electronic shutter control device for an electronic endoscope which controls exposure with high accuracy and achieves good picture taking even if the intensity of incident light is high in a close-up or the like.

In order to achieve the above object, according to an aspect of the present invention, there is provided an electronic shutter control device for an electronic endoscope which comprises a mask circuit for forming masks having a predetermined width in upper and lower portions of a monitor screen in a vertical scanning direction, a detection circuit for verifying whether or not the intensity of light incident on a solid-state image pickup device is higher than a predetermined value, and an electronic shutter control circuit for forming a control pulse for an electronic shutter from a driving pulse generated in a blanking period of a horizontal synchronizing signal when it is verified by the detection circuit that the intensity of incident light is lower than the predetermined value, and for generating a driving pulse in an effective period of the horizontal synchronizing signal in an area masked in the vertical scanning direction and forming a control pulse for the electronic shutter from the driving pulse when it is verified that the intensity of incident light is higher than the predetermined value. The above predetermined value is an exposure control value determined by a mask width in the vertical scanning direction.

According to another aspect of the present invention, a detection circuit and an electronic shutter control circuit are structured in the same manner as above, and a mask circuit forms a mask signal having a predetermined width in at least one of upper and lower portions of a monitor screen in a vertical scanning direction when it is verified by the detection circuit that the intensity of incident light is higher than a predetermined value, and does not form the above mask signal when it is verified that the intensity of incident light is lower than the predetermined value.

In both the above aspects, the mask formed by the mask circuit may be located in both upper and lower portions in the vertical scanning direction, or only in an upper or lower portion.

Furthermore, for example, a setting means, such as a variable resistor, may be disposed in the mask circuit and the electronic shutter control circuit to arbitrarily set a position to produce a mask and a position to generate a driving pulse in an effective period of a horizontal synchronizing signal.

Such control device further comprises a solid-state image pickup device, a signal processing circuit for applying image processing to a signal obtained by electronic shutter control exerted on the solid-state image pickup device, and a circuit for forming an exposure control signal for the electronic shutter control from a brightness signal output from the signal processing circuit. The detection circuit can verify, based on the exposure control signal and a mask position signal from the mask circuit, whether or not the intensity of incident light is higher than a predetermined value, and the electronic shutter control circuit can generate a driving pulse in an effective period of a horizontal synchronizing signal in the mask area when it is verified based on the output of the detection circuit that the intensity of incident light is higher than the predetermined value.

According to the above structure, when the intensity of incident light is higher than the predetermined value, a driving pulse is generated in an effective period as well as a blanking period of the horizontal synchronizing signal in an area where a preset mask or a mask formed only at this time is provided. For example, 256 driving pulses (8-bit structure) are formed in a horizontal synchronizing signal of one pulse. The high-density driving pulses and the exposure control signal form control pulses, such as a discharge pulse and a read pulse, thereby carrying out an electronic shutter operation.

Since image signals in a mask insertion area are removed, when mask areas are located in upper and lower portions of the monitor screen in the vertical scanning direction, even if a control pulse is used in the effective period of the horizontal synchronizing signal, there is no bad influence on an image. On the other hand, when the subject is relatively bright in a close-up and the like, exposure control is performed in the latter part of the vertical scanning period (lower side of the screen). Noticing, for example, the lower mask area, control pulses are formed even in effective periods of the horizontal synchronizing signals in this lower mask area. Accordingly, when the storage time is short in a close-up or the like, it is possible to achieve high-precision exposure control, and to obtain good images.

DESCRIPTION OF THE PREFERRED EMBODIMENTS

Embodiment 1

Figure 1:
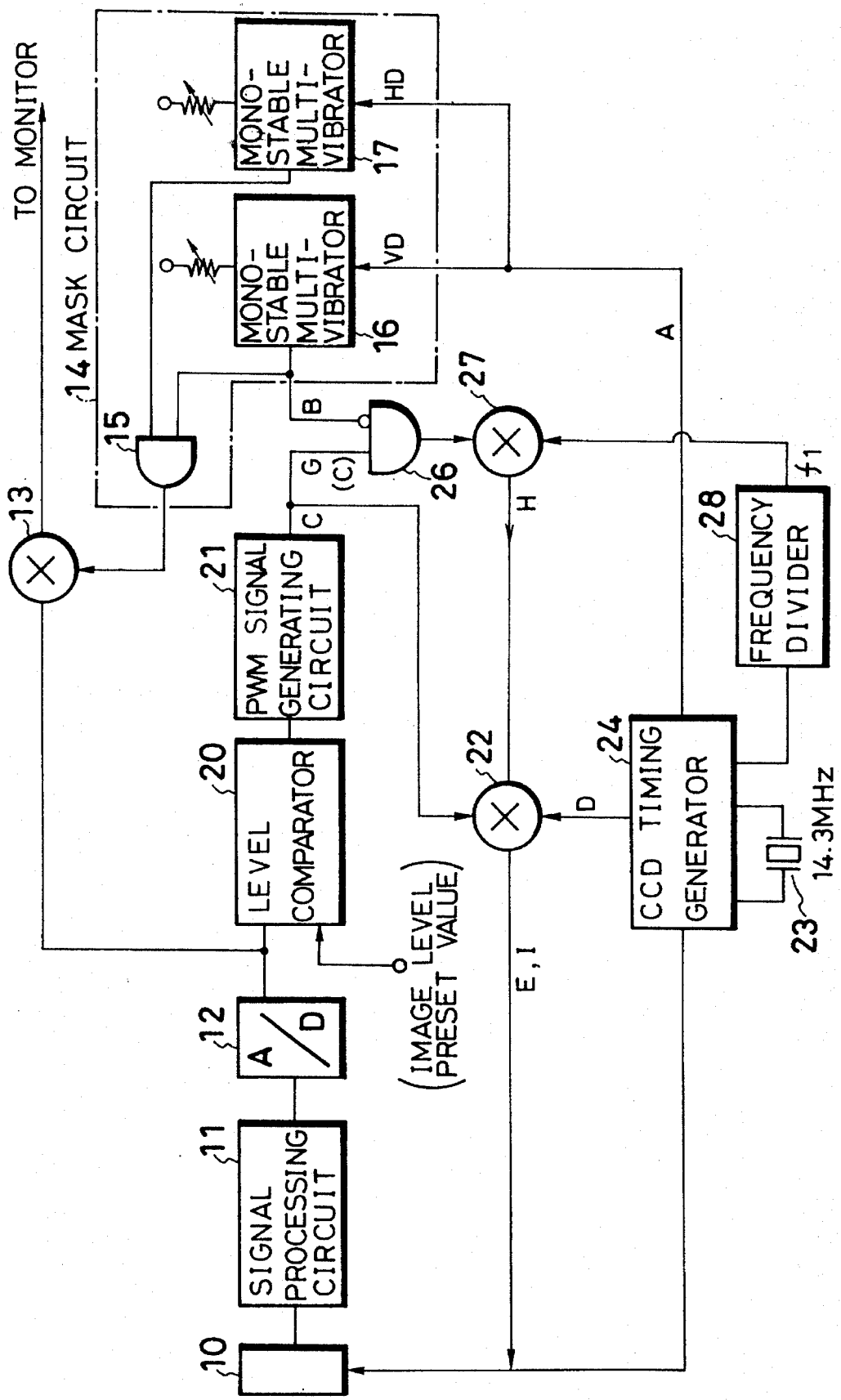
FIG. 1 is a block diagram showing the structure of an electronic shutter control device for an electronic endoscope according to a first embodiment of the present invention.

FIG. 1 shows the structure of an electronic shutter control device according to a first embodiment of the present invention. The first embodiment is applied to an electronic endoscopic device in which masks having a predetermined width are formed in upper and lower portions in a vertical scanning direction, Referring to FIG. 1, a CCD 10 is disposed at the leading end of the endoscope. At this leading end, radiation light for picture taking is supplied from a light source into the body cavity or the like. The CCD 10 is connected to a signal processing circuit 11 which performs processing, such as amplification and gamma correction, and is connected to a mixer 13 through an A/D converter 12. The mixer 13 is also connected to a mask circuit 14 which comprises an AND circuit 15, a monostable multivibrator 16 for inputting a vertical synchronizing signal VD, and a monostable multivibrator 17 for inputting a horizontal synchronizing signal HD. In the mask circuit 14, a mask signal for masking the outer periphery of a screen is formed based on the vertical synchronizing signal VD and the horizontal synchronizing signal HD, and added to a video signal output from the A/D converter 12 by the mixer 13. In this embodiment, a mask M is put on a monitor screen 50 except for a circular image display portion, whereby respective upper and lower portions of the screen 50 in the vertical scanning direction are each completely shielded by a mask width D.

A level comparator 20 for detecting the brightness of an image and a PWM (Pulse Width Modulation) signal generating circuit 21 are connected in the next stage of the A/D converter 12. The level comparator 20 compares a brightness signal in the video signal with an image level preset value, and judges the present intensity of incident light. The PWM signal generating circuit 21 forms an exposure control signal having a width determined based on the output of the level comparator 20. A charge storage time of the CCD 10 as an exposure time is determined by the exposure control signal.

A mixer 22 is located in the next stage of the PWM signal generating circuit 21 to carry out electronic shutter control in picture taking conditions other than a close-up. The electronic shutter control device is also provided with a CCD timing generator 24 having a quartz oscillator 23. A driving pulse generated in each blanking period of a horizontal synchronizing signal is supplied from the timing generator 24 to the mixer 22. Therefore, the driving pulse and the exposure control signal form a discharge pulse (substrate pulse) Pa for picture taking other than a close-up.

Figure 3:
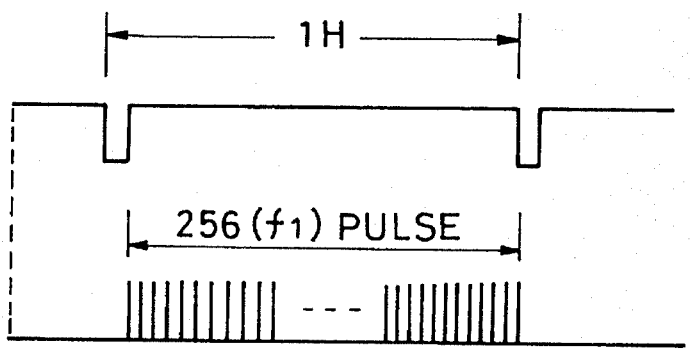
FIG. 3 is a chart showing driving pulses to be formed in an effective period of a horizontal synchronizing signal.

On the other hand, an AND circuit 26, a mixer 27 and a frequency divider 28 for obtaining a pulse of a frequency f1 are mounted to control a close-up. The exposure control signal from the PWM signal generating circuit 21 is input, and a mask position signal in the vertical direction from the monostable multivibrator 16 is reversely input to the AND circuit 26, where decision is made as to whether or not the exposure control signal lies on a mask area (whether or not a discharge pulse is output in the mask area). In other words, an AND output (High) means that the exposure control signal reaches the mask area and the discharge pulse is used in the mask area, and the output of the AND circuit 26 is supplied to the mixer 27. On the other hand, in the dividing circuit 28, 256 driving pulses (8-bit structure) are, as shown in FIG. 3, formed with the frequency f1 in one horizontal synchronizing signal (1H) of FIG. 3(A). Therefore, the mixer 27 forms a discharge pulse Pa for a close-up when both the driving pulse and the AND output (High) signal are output.

Figure 4:
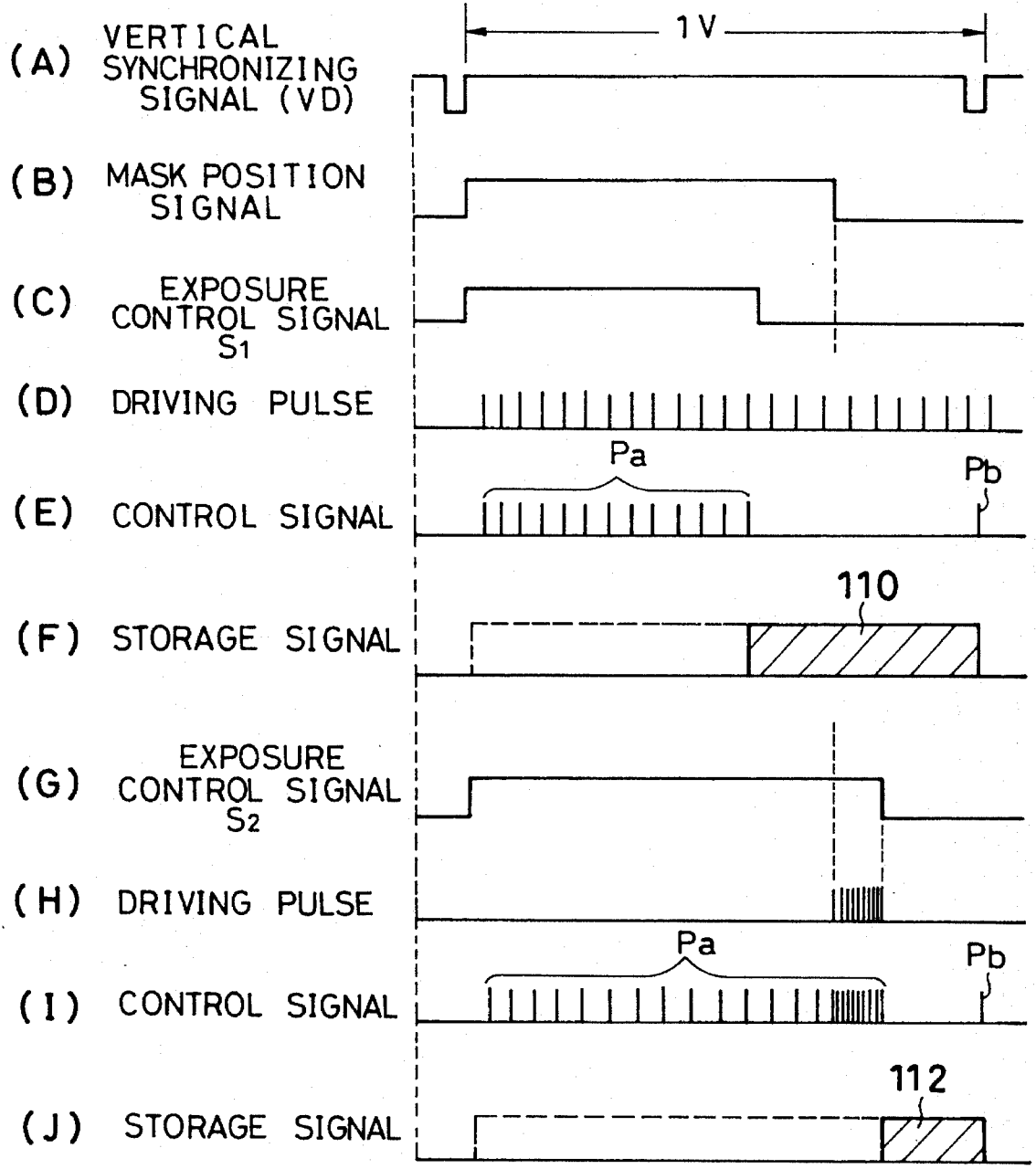
FIG. 4 is a signal waveform chart showing the operation of the first embodiment.

The operation of the embodiment having the above structure will be described with reference to FIG. 4. A mask position signal in a vertical direction output from the monostable multivibrator 16 in the mask circuit 14 relative to a vertical synchronizing signal shown in FIG. 4(A) is as shown in FIG. 4(B). In a state in which the leading end of the electronic endoscope is not close to a subject, a brightness signal (intensity of incident light) is not high, and, for example, an exposure control signal S1 shown in FIG. 4(C) is output from the PWM signal generating circuit 21 shown in FIG. 1. Although the exposure control signal S1 is output to the AND circuit 26 as well as the mixer 22, since an AND condition is not satisfied by the mask position signal shown in FIG. 4(B) in this AND circuit 26, only the mixer 22 operates.

In the mixer 22, driving pulses shown in FIG. 4(D) output from the timing generator 24 and the exposure control signal S1 are mixed to make discharge pulses Pa shown in FIG. 4(E), which are supplied to the CCD 10. Therefore, in this case, a charge 110 shown in FIG. 4(F) is stored and read out as an image signal.

On the other hand, when the leading end of the electronic endoscope is close to the subject and an exposure control signal S2 of FIG. 4(G) is output from the PWM signal generating circuit 21, the AND condition is satisfied by the mask position signal of FIG. 4(B) in the AND circuit 26 shown in FIG. 1, and the mixer 27 operates. At this time, since the driving pulses shown in FIG. 3(B) are input from the frequency divider 28 to the mixer 27, driving pulses formed in an effective period of one horizontal synchronizing signal are output from the mixer 27 to the mixer 22 as shown in FIG. 4(H). As a result, discharge pulses Pa of FIG. 4(I) are supplied from the mixer 22 to the CCD 10. Therefore, in the close-up in which the intensity of incident light is higher than a preset value, more accurate sweep control is performed than when the intensity of incident light is low, thereby achieving high-precision exposure control by the electronic shutter operation, and eliminating exposure errors.

Figure 2:
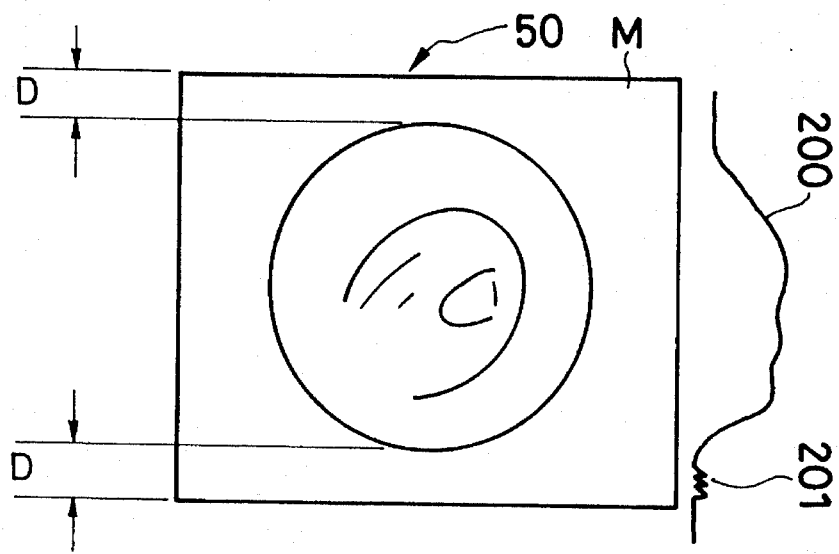
FIG. 2 is an explanatory view showing a mask area of the first embodiment.

As shown in FIG. 2, the driving pulses of FIG. 4(H) are output within the lower mask width D, and a signal having a waveform 201 is mixed into a video signal waveform 200. However, this mixed signal does not have any bad influence on a video signal in an image display area.

As described above, in an electronic endoscopic device having a mask circuit according to the first embodiment, it is possible to control exposure with higher accuracy in a close-up or the like than other picture taking conditions, and to obtain good image display without exposure errors as a whole.

Embodiment 2

Figure 5:
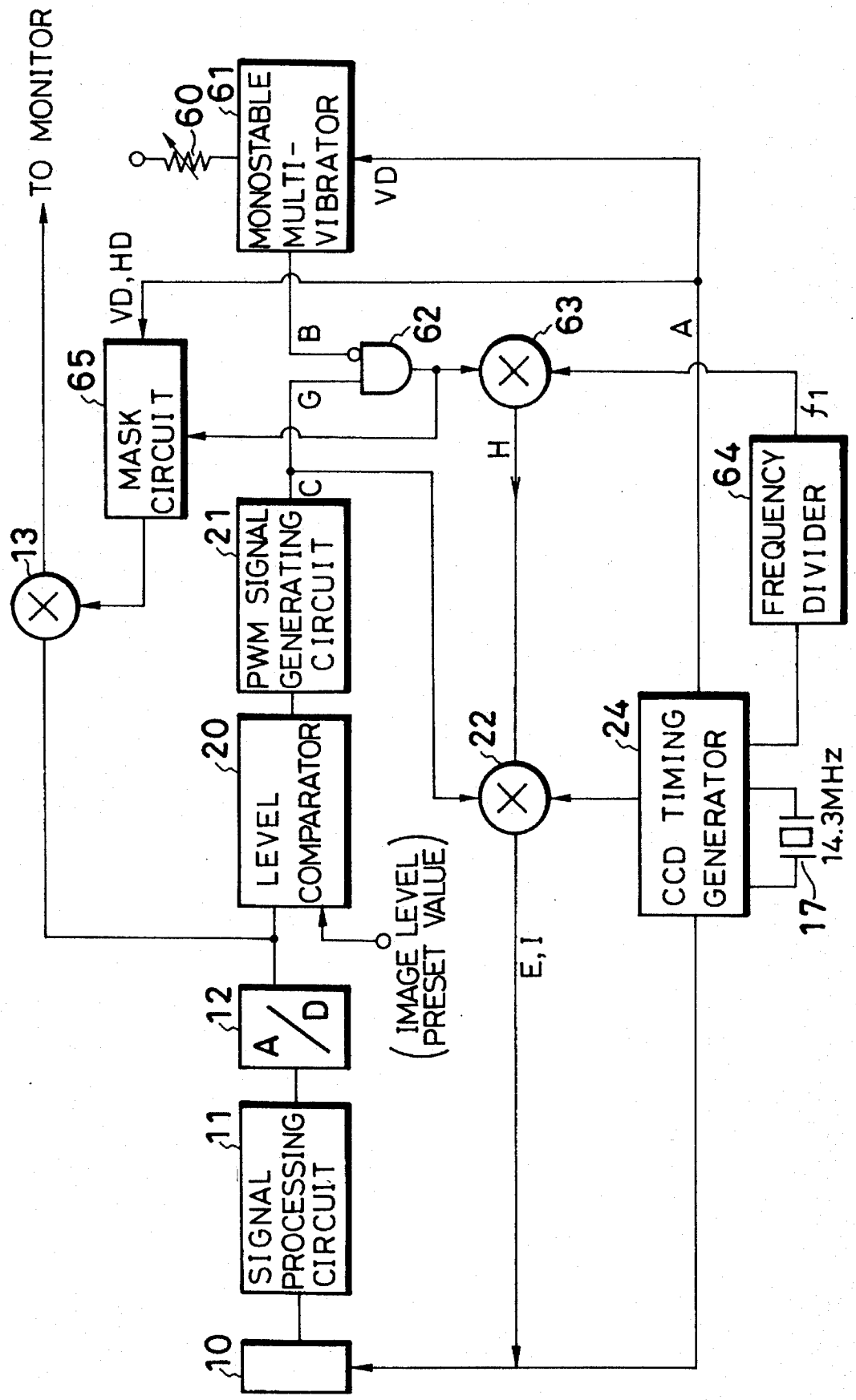
FIG. 5 is a block diagram showing the structure of an electronic shutter control device for an electronic endoscope according to a second embodiment of the present invention.

FIG. 5 shows the structure of an electronic shutter control device according to a second embodiment of the present invention. The second embodiment produces masks having a predetermined width in upper and lower portions in the vertical scanning direction only when the intensity of incident light is high. Referring to FIG. 5, a CCD 10, a signal processing circuit 11, an A/D converter 12, a mixer 13, a level comparator 20, a PWM (Pulse Width Modulation) signal generating circuit 21, a mixer 22 and a CCD timing generator 24 are mounted in the same manner as in the first embodiment.

The level comparator 20 compares a brightness signal in a video signal and an image level preset value and judges the present intensity of incident light, and the PWM signal generating circuit 21 forms an exposure control signal having a width determined based on the output of the level comparator 20. In addition, a driving pulse generated in each blanking period of a horizontal synchronizing signal is supplied from the timing generator 24 to the mixer 22. Therefore, the driving pulse and the exposure control signal are combined to form a discharge pulse (substrate pulse) Pa for picture taking conditions other than a close-up.

In order to control a close-up, a monostable multivibrator 61 having a variable resistor 60, an AND circuit 62, a mixer 63 and a frequency divider 64 for obtaining pulses of a frequency f1 are provided. The monostable multivibrator 61 forms a switch position signal for switching to the electronic shutter control for a close-up based on a vertical synchronizing signal VD input from the CCD timing generator 24. In other words, this switch position signal is a signal for setting a switch position E as shown in FIG. 7(B), described later, and a signal corresponding to a mask position where a mask is produced in the above vertical scanning direction. The switch position E is arbitrarily set by the variable resistor 60 corresponding to a predetermined intensity value of incident light (for example, the 250th of 262.5 horizontal synchronizing signals). When the exposure control signal exceeds the switch position E, a close-up state is selected.

The exposure control signal is input from the PWM signal generating circuit 21 to the AND circuit 62, and the switch position signal is reversely input from the monostable multivibrator 61 thereto. Decision is made by the AND circuit 62 as to whether or not a close-up is to be performed (whether or not a high-density discharge pulse is to be output). In short, an AND output (High) means a state in which the exposure control signal exceeds the switch position, or a state in which the discharge pulse is used in a mask area. The output of the AND circuit 62 is supplied to the mixer 63. On the other hand, 256 (8-bit structure) driving pulses are formed with the frequency f1 in one horizontal synchronizing signal (1H) of FIG. 3(A) in the frequency divider 64 as shown in FIG. 3. Therefore, when both the driving pulses and the AND output signal are output, the mixer 63 forms discharge pulses Pa for a close-up.

Figure 6:
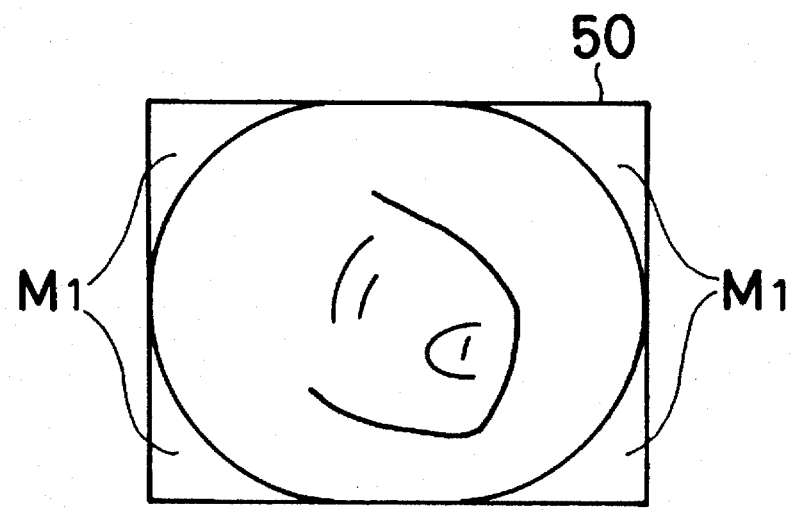
FIG. 6(A) is a view showing a mask area set when the intensity of incident light is low in the second embodiment.
FIG. 6(B) is a view showing a mask area set when the intensity of incident light is high in the second embodiment.
Figure 6:
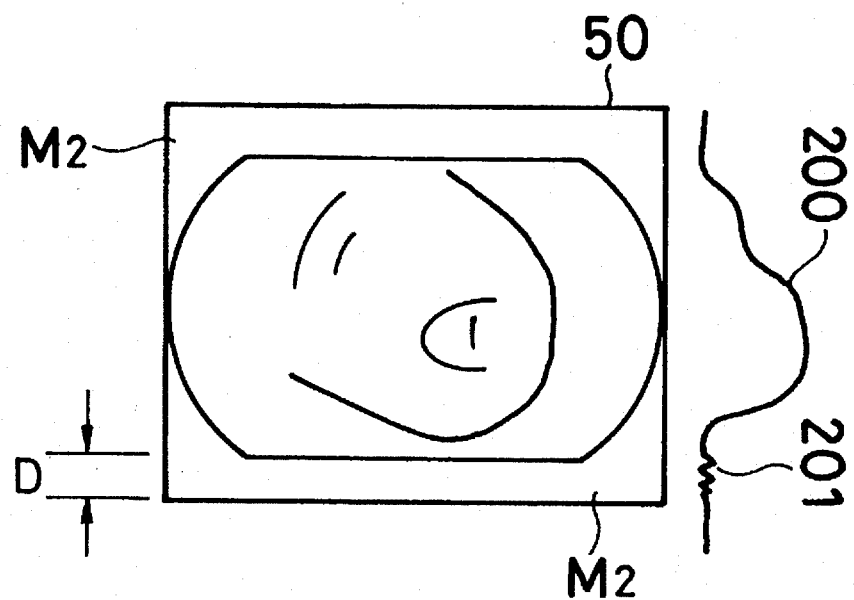

The mixer 13 is connected to a mask circuit 65, in which a mask signal for masking the outer periphery of a screen is formed based on the vertical synchronizing signal VD input from the CCD timing generator 24 and the horizontal synchronizing signal HD. In the second embodiment, as shown on a monitor screen 50 of FIG. 6, while a mask M1 for shielding the four corners except for an almost circular image display portion shown in FIG. 6(A) is put on in picture taking states other than a close-up, and a mask M2 shown in FIG. 6(B) is put on in the close-up. The mask M2 is formed by adding band masks each having a width D to upper and lower portions of the mask M1 on the screen 50 in the vertical scanning direction, by which the image area for outputting control pulses in the effective period of the horizontal synchronizing signal is completely shielded. The vertical-direction mask may be displayed only in the lower portion (at least the lower mask is necessary).

Figure 7:
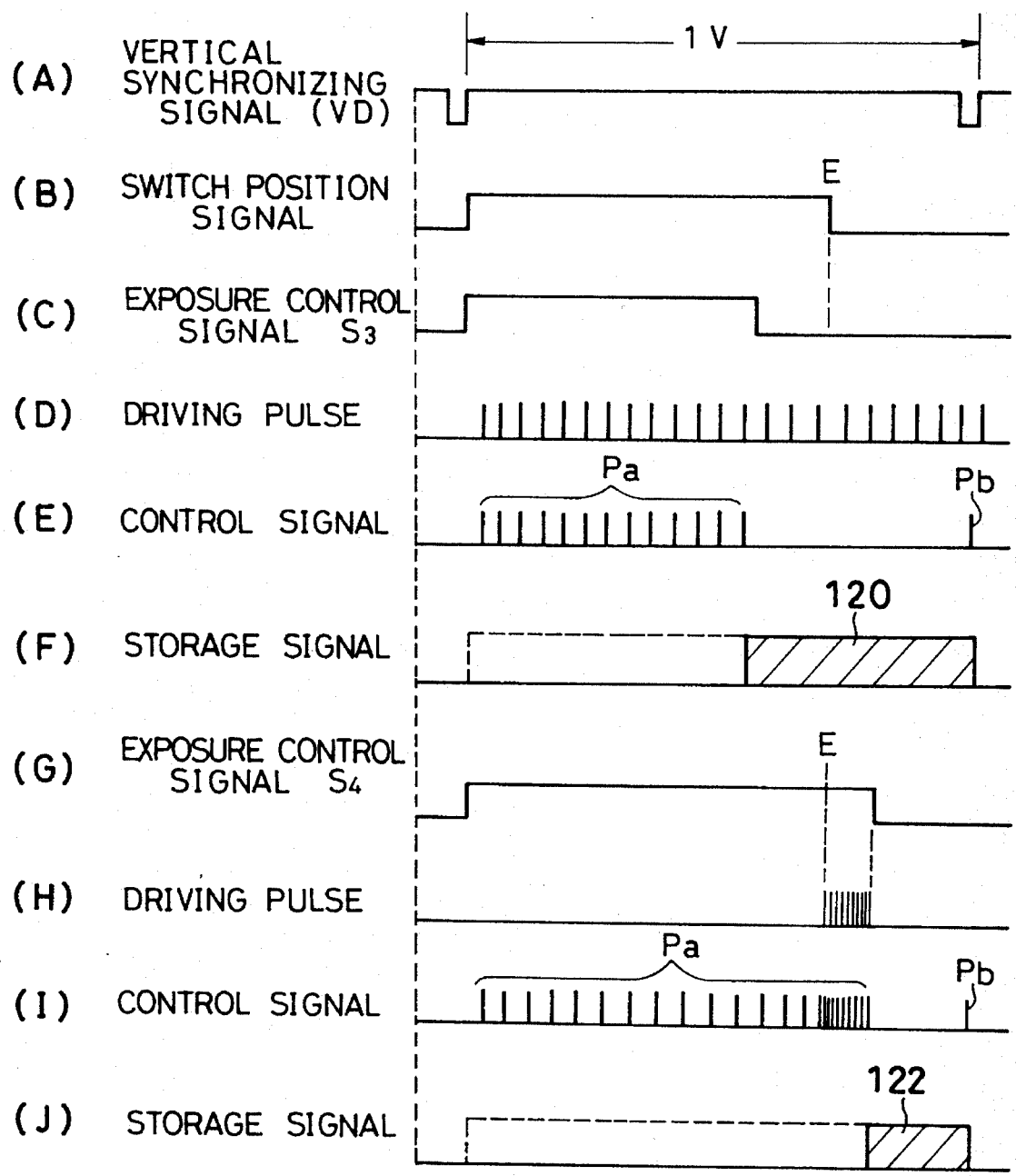
FIG. 7 is a signal waveform chart showing the operation of the second embodiment.
Figure 8:
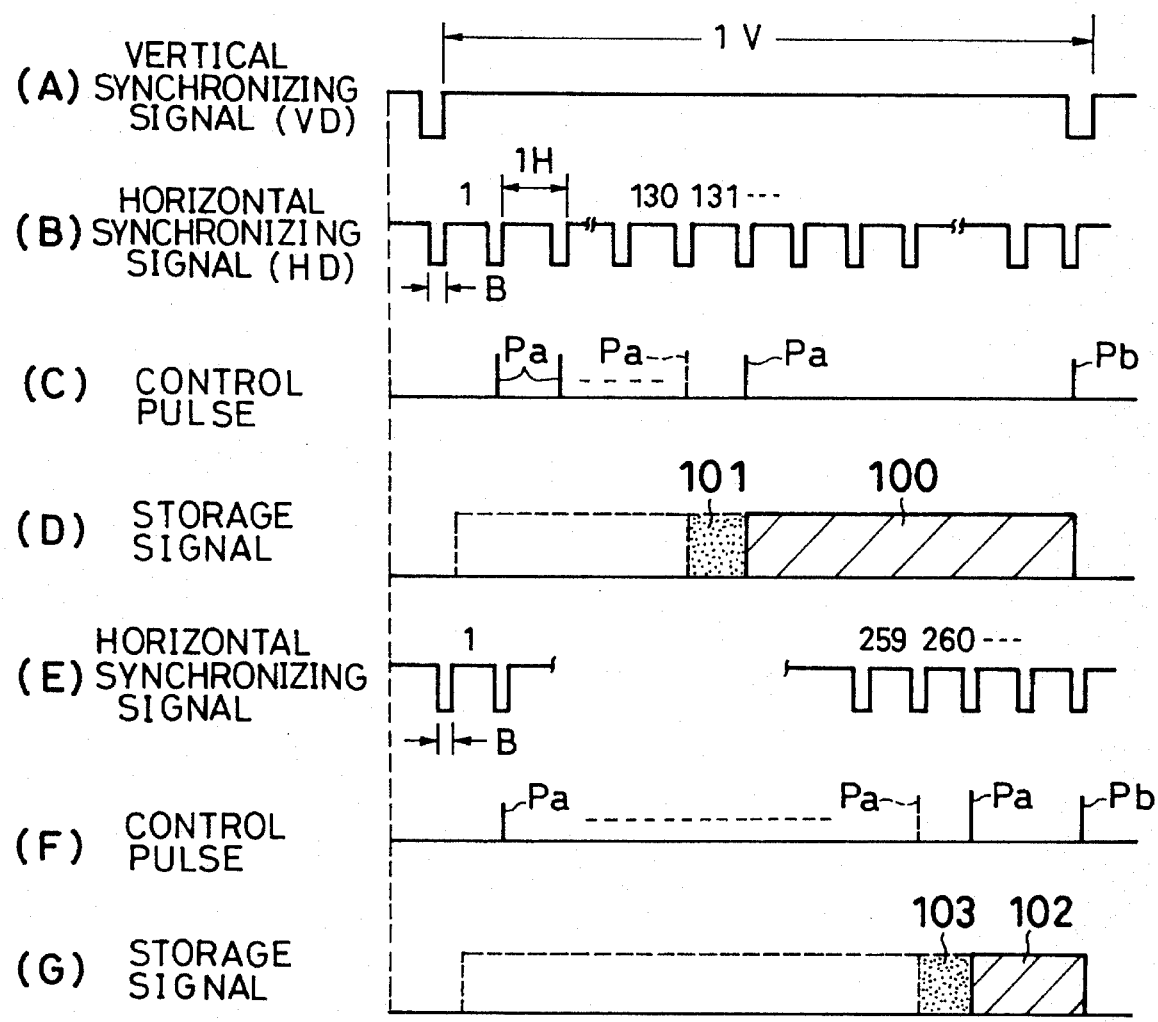
FIG. 8 is a waveform chart showing the operation of a conventional electronic shutter control device.

The operation of this embodiment having the above structure will now be described with reference to FIG. 7. While a vertical synchronizing signal is output as shown in FIG. 7(A), a switch position signal shown in FIG. 7(B) is output from the monostable multivibrator 61. Since a brightness signal (intensity of incident light) is not high when the leading end of the electronic endoscope is not close to the subject, an exposure control signal S3 shown in FIG. 7(C) is output from the PWM signal generating circuit 21. Although the exposure control signal S3 is supplied to the mixer 22 and the AND circuit 62, since an AND condition relative to the switch position signal of FIG. 7(B) is not satisfied in the AND circuit 62, only the mixer 22 operates.

In the mixer 22, driving pulses of FIG. 7(D) output from the timing generator 24 and the exposure control signal S3 are mixed to make discharge pulses Pa as shown in FIG. 7(E). Therefore, in this case, a charge 120 shown in FIG. 7(F) is stored, and read out as an image signal.

On the other hand, when the leading end of the electronic endoscope is close to the subject and an exposure control signal S4 exceeding the switch position E is output as shown in FIG. 7(G) (the intensity of incident light exceeds a predetermined value), an AND condition is satisfied by the switch position signal of FIG. 7(B) in the AND circuit 62 shown in FIG. 5, and the mixer 63 operates. At this time, since the driving pulses of FIG. 3(B) are input from the dividing circuit 64 to the mixer 63, driving pulses formed in an effective period of one horizontal synchronizing signal are output from the mixer 63 to the mixer 22 as shown in FIG. 7(H). As a result, discharge pulses Pa shown in FIG. 7(I) are supplied from the mixer 22 to the CCD 10, and a charge 122 shown in FIG. 7(J) is stored. Therefore, in a close-up in which the intensity of incident light is higher than a predetermined value, more accurate sweep control and higher-precision exposure by the electronic shutter operation than when the intensity of incident light is low can be achieved, and exposure errors can be eliminated.

Simultaneously with the above operation, an AND output of the AND circuit 62 is supplied to the mask circuit 65, and the mask M2 of FIG. 6(B) is displayed in a close-up. At this time, although the driving pulses of FIG. 7(H) are output in the lower mask width D shown in FIG. 6 and a signal having a waveform 201 is mixed in a video signal waveform 200, this signal does not have any bad influence on the video signal in the image display area. As described above, in the second embodiment, the accuracy of exposure control can be made higher in a close-up and the like than that of other picture taking conditions.

Although discharge pulses are output in an effective period of one horizontal synchronizing signal and a read pulse is output in a blanking period in the above first and second embodiments, the discharge pulses and the read pulse can be generated in other manners. For example, contrary to the above relationship between the discharge pulse and the read pulse, it is possible to output a discharge pulse in the blanking period of the vertical synchronizing signal and the read pulse in the effective period of the vertical synchronizing signal.

What is claimed is:

1. An electronic shutter control device for an electronic endoscope, comprising:

a mask circuit for forming masks having a predetermined width in upper and lower portions of a monitor screen in a vertical scanning direction;

a detection circuit for verifying whether or not the intensity of light incident on a solid-state image pickup device is higher than a predetermined value; and an electronic shutter control circuit for forming control pulses for an electronic shutter from a first driving pulse generated in a blanking period of a horizontal synchronizing signal when it is verified by said detection circuit that the intensity of incident light is lower than the predetermined value, and for generating a second driving pulse in an effective period of the horizontal synchronizing signal in an area masked in the vertical scanning direction and forming control pulses for the electronic shutter from the second driving pulse when it is verified that the intensity of incident light is higher than the predetermined value.

2. An electronic shutter control device for an electronic endoscope according to claim 1, further comprising:

setting means for arbitrarily setting a mask producing position and a position to generate the second driving pulse reaching the effective period of the horizontal synchronizing signal.

3. An electronic shutter control device for an electronic endoscope according to claim 1, further comprising:

a solid-state image pickup device;

a signal processing circuit for applying image processing to a signal obtained by electronic shutter control exerted on said solid-state image pickup device; and a circuit for forming an exposure control signal for the electronic shutter control from a brightness signal output from said signal processing circuit, wherein said detection circuit verifies based on the exposure control signal and a mask position signal from said mask circuit whether or not the intensity of incident light is higher than the predetermined value, and said electronic shutter control circuit generates the second driving pulse in the effective period of the horizontal synchronizing signal in said mask area when it is verified based on the output of said detection circuit that the intensity of incident light is higher than the predetermined value.

4. An electronic shutter control device for an electronic endoscope, comprising:

a detection circuit for verifying whether or not the intensity of light incident on a solid-state image pickup device is higher than a predetermined value;

a mask circuit for forming a mask signal having a predetermined width in at least one of upper and lower portions of a monitor screen in a vertical scanning direction when it is verified by said detection circuit that the intensity of incident light is higher than the predetermined value, and prohibiting the formation of the mask signal when it is verified that the intensity of incident light is lower than the predetermined value; and an electronic shutter control circuit for forming control pulses for an electronic shutter from a first driving pulse generated in a blanking period of a horizontal synchronizing signal when the intensity of incident light is lower than the predetermined value, and for generating a second driving pulse in an effective period of the horizontal synchronizing signal in an area masked in the vertical scanning direction and forming control pulses for the electronic shutter from the second driving pulse when the intensity of incident light is higher than the predetermined value.

5. An electronic shutter control device for an electronic endoscope according to claim 4, wherein said mask circuit produces masks in both upper and lower portions of said monitor screen in the vertical scanning direction when the intensity of incident light is higher than the predetermined value.

6. An electronic shutter control device for an electronic endoscope according to claim 4, wherein said mask circuit produces a mask only in a lower portion of said monitor screen in the vertical scanning direction when the intensity of incident light is higher than the predetermined value.

7. An electronic shutter control device for an electronic endoscope according to claim 4, further comprising:

setting means for arbitrarily setting a mask producing position and a position to generate the second driving pulse reaching the effective period of the horizontal synchronizing signal.

8. An electronic shutter control device for an electronic endoscope according to claim 4, further comprising:

a solid-state image pickup device;

a signal processing circuit for applying image processing to a signal obtained by electronic shutter control exerted on said solid-state image pickup device; and a circuit for forming an exposure control signal for the electronic shutter control from a brightness signal output from said signal processing circuit, wherein said detection circuit verifies based on the exposure control signal and a mask position signal from said mask circuit whether or not the intensity of incident light is higher than the predetermined value, and said electronic shutter control circuit generates a driving pulse driving pulse in the effective period of the horizontal synchronizing signal in said mask area when it is verified based on the output of said detection circuit that the intensity of incident light is higher than the predetermined value.

* * * * *